Aug. 21, 1951 D. C. BETTISON 2,565,117
TRAFFIC PROTECTION APPARATUS
Filed April 16, 1947

INVENTOR.
David C. Bettison.
BY
HIS ATTORNEY.

Patented Aug. 21, 1951

2,565,117

UNITED STATES PATENT OFFICE 2,565,117

TRAFFIC PROTECTION APPARATUS

David C. Bettison, Omaha, Nebr., assignor to The Union Switch and Signal Company, Swissvale, Pa., a corporation of Pennsylvania Application April 16, 1947, Serial No. 741,805

12 Claims. (Cl. 246—114)

My invention relates to traffic protection apparatus, and particularly to apparatus for providing crossover protection for trains moving along railway tracks which are interconnected by a crossover track through hand-operated track switches.

A requisite for crossover protection apparatus is that it must be so arranged that a car or locomotive while occupying a crossover such, for example, as one connecting two main tracks, while the switches are in the normal position for train movements along the main tracks, will cause a signal for each main track to indicate stop if the car or locomotive is within fouling distance of that main track.

In traffic protection schemes embodying track circuits for crossovers or other auxiliary tracks, protection should be provided against operation of a track relay for a section of main track by stray current from a source of current for a crossover or other auxiliary track circuit. Protection against defective insulated joints should also be provided.

One feature of my invention is the provision of an arrangement of polarities of track circuits for auxiliary or crossover tracks with relation to the polarities of main track circuits, and the provision of polarized relays for the adjacent main track circuits having a novel pick-up and retaining circuit for providing protection against operation of the main track circuit relays by stray current from a crossover or other auxiliary track circuit.

Another feature of my invention is the provision of a jumper connection across the rails on opposite sides of a pair of insulated joints at a mid-point of a crossover track where one source of current is connected across the rails on one side of the pair of insulated joints, and a second source of current is connected across the rails with opposite polarities on the other side of the pair of insulated joints.

I shall describe two forms of apparatus embodying my invention, and shall then point out the novel features thereof in claims.

Figure 1:
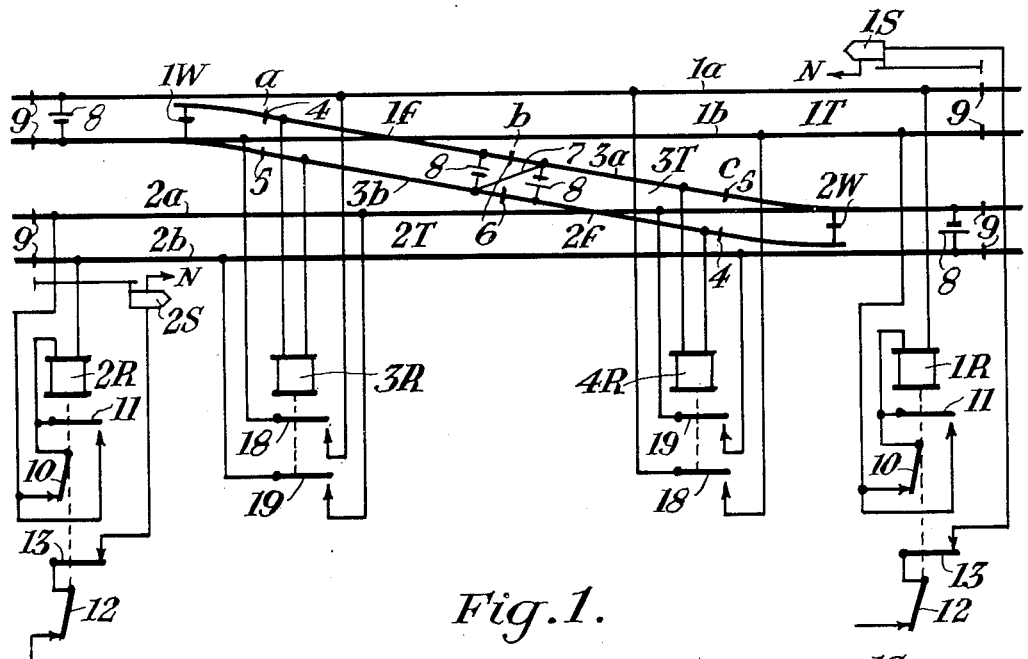
Figure 2:
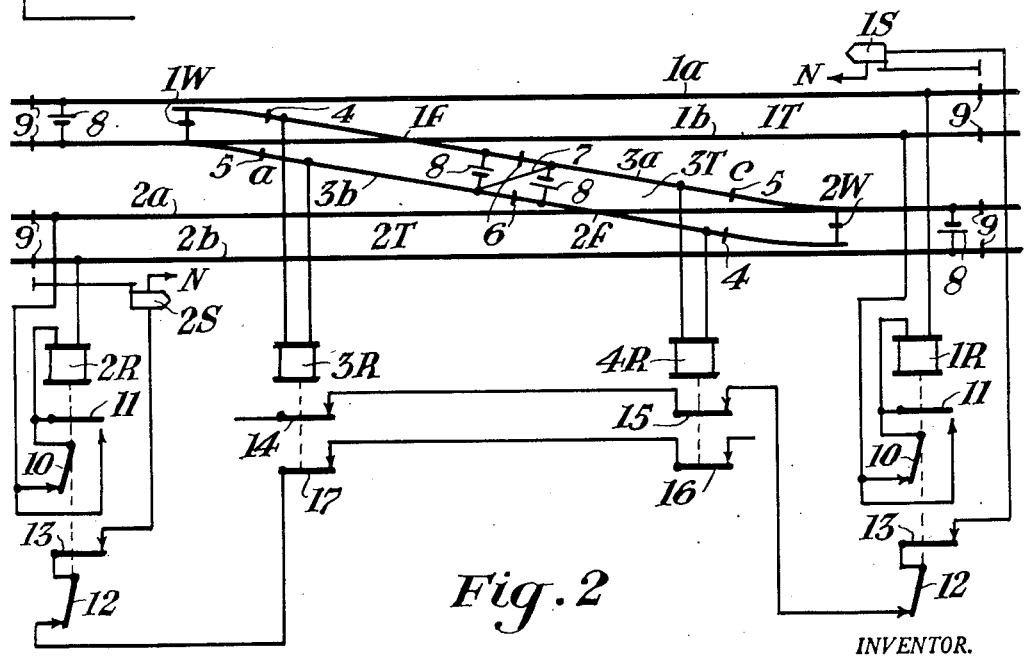

In the accompanying drawings, Fig. 1 is a diagrammatic view showing one form of apparatus embodying my invention in which a crossover track is provided with two track circuits separated by a pair of insulated joints and arranged to have opposite polarities and with a jumper connection across the rails on opposite sides of the pair of insulated joints between terminals of like polarity of the sources of current for the two track circuits, and in which the main track circuits which include the track switches at the ends of the crossover track are provided with polarized relays and are arranged to have a polarity on their frog side which is opposite to the polarity on the frog side of an adjacent crossover track circuit; and Fig. 2 is a diagrammatic view showing a modified form of the apparatus of Fig. 1 in which the crossover track relays control line circuits for controlling signals for the main tracks, whereas in Fig. 1 the crossover track relays control the main track circuits.

Similar reference characters refer to similar parts in each of the views.

Referring first to Fig. 1, a stretch of railway is shown comprising two main tracks, designated by the reference characters 1T and 2T, connected with each other by a crossover track, designated by the reference character 3T, through hand-operated switches 1W and 2W.

A pair of insulated joints 4 and 5 is provided at points a and c in the ends of track 3T. Joint 4 of each of these pairs is located in the frog side of track 3T between the rails of the adjacent main track, and joint 5 is located in the other side of the crossover track adjacent the heel of the switch at that end of track 3T.

Crossover track 3T is divided at a mid-point b by a pair of insulated joints 6 into two sections a—b and b—c. A jumper 7 is connected across the rails of track 3T on opposite sides of the pair of insulated joints 6 between like terminals of suitable sources of track circuit current, shown as positive terminals of batteries 8 for sections a—b and b—c. The opposite or negative terminals of batteries 8 are connected to the frog side of sections a—b and b—c in which the frogs 1f and 2f associated with switches 1W and 2W, respectively, are located. Track relays, designated by the reference characters 3R and 4R, are connected across the rails of the opposite ends of sections a—b and b—c, respectively.

A section of each main track 1T and 2T is set off by insulated joints 9, including switch 1W or 2W, respectively. A suitable source of track circuit current, such as a battery 8, is connected across the rails of one end of each of these main track sections, and a polarized track relay 1R or 2R is connected across the rails of the opposite ends of the sections of tracks 1T and 2T, respectively.

It will be noted that the positive terminals of batteries 8 for the main track circuit sections are connected to the frog rails of the main tracks in which frogs 1f and 2f are located, whereas the negative terminals of batteries 8 for the crossover track sections are connected to the frog sides of the crossover track sections.

Back contacts of each of the crossover track circuit relays 3R and 4R complete shunt paths across the main track sections when these relays are deenergized.

A signal 1S governs traffic movements over track 1T to the left, as shown in the drawing, which I shall assume is the westbound direction, and a signal 2S governs traffic movements in the opposite or eastbound direction over track 2T. Signals 1S and 2S may be of any suitable type, such, for example, as the well-known semaphore or searchlight signals and are controlled by circuit including front neutral and normal polar contacts of relay 1R and 2R, respectively.

Referring now to Fig. 2, the track circuits are here arranged as in Fig. 1 except that the main track section shunt paths controlled by relays 3R an 4R are omitted. The circuits for controlling signals 1S and 2S here include front contacts of relays 3R and 4R in addition to the contacts of relays 1R and 2R, shown in Fig. 1.

I shall now describe in detail the circuits and operation of the various parts of apparatus embodying my invention, shown in the accompanying drawings.

As shown in the drawings, all parts of the apparatus are in the normal condition, that is, each of the switches 1W and 2W is in the normal position for a train movement along main track 1T or 2T, respectively; each of the crossover track relays 3R and 4R is energized; each of the main track section relays 1R and 2R is energized by current of normal polarity; and each of the signals 1S and 2S is displaying a proceed indication.

In Fig. 1, each of the track relays 1R and 2R is energized by a retaining circuit which, for relay 1R, passes from the positive terminal of battery 8, through rail 1b of track 1T including frog 1f, contact 10 of relay 1R, winding of relay 1R, and rail 1a of track 1T back to battery 8. The retaining circuit by which relay 2R is energized is similar to the circuit just traced for relay 1R.

I shall assume that, with appaartus arranged as shown in Fig. 1, a trainman reverses switches 1W and 2W for a train to move over track 3T. According to common practice, switches 1W and 2W, upon being moved to their reverse position, would place shunts across the rails of the sections of the main tracks, thereby deenergizing relays 1R and 2R. In order to simplify the drawing, I have omitted such shunts.

With the track circuits for tracks 1T and 2T shunted by reversal of switches 1W and 2W, relays 1R and 2R will become deenergized, and their contacts 13 will therefore open the circuits for signals 1S and 2S, causing these signals to display the stop indication.

The train, upon moving over the crossover track, will shunt sections a—b and b—c, causing relays 3R and 4R, respectively, to also become deenergized. With relays 3R and 4R deenergized, shunt paths including contacts 18 of these relays will be closed across the section of main track 1T, and shunt paths including contacts 19 of these relays will be closed across the section of main track 2T.

I shall assume further that, after the train has proceeded over the crossover track, a trainman restores switches 1W and 2W to the normal position, but that a car has been left standing on section a—b. On account of section a—b being shunted by the car, relay 3R will remain deenergized, and hence the track circuits for the main tracks will continue to be shunted by contacts 18 and 18 of relay 3R, so that relays 1R and 2R will remain deenergized and signals 1S and 2S will continue to indicate stop.

I shall also assume further that the trainman then reverses the switches for removal of the car and that, after the car has been removed, he again restores switches 1W and 2W to their normal position. With the crossover track now unoccupied, relays 3R and 4R will again be energized by their track circuits.

At the instant that relay 3R opens its back contact 18, relay 1R will become energized by a pick-up circuit which is the same as the retaining circuit previously traced except that it includes contact 11 of relay 1R in multiple with contact 10 of relay 1R. Relay 1R will then continue energized by its retaining circuit, previously traced, after contact 11 of relay 1R opens. Relay 2R becomes energized by a similar pick-up circuit at the instant that contact 19 of relay 3R opens. With relays 1R and 2R now again energized by current of normal polarity, contacts 12 and 13 of these relays will be closed in the circuits for signals 1S and 2S, causing signals 1S and 2S to again display a proceed indication.

I shall now assume that the battery 8 for the section of main track 1T becomes disconnected from rail 1b, and that there is a low resistance leakage path from rail 3b of section a—b to rail 1a of track 1T. Relay 1R will therefore now be energized by current of reverse polarity passing from the positive terminal of battery 8 for section a—b, through rail 3b of section a—b, the leakage path to rail 1a of track 1T, winding of relay 1R, contact 10 and then also contact 11 of relay 1R, rail 1b of track 1T, frog 1f, and rail 3a of section a—b, back to battery 8 for section a—b. With relay 1R now energized by current of reverse polarity, contact 10 will open, and contacts 12 and 13 of this relay will open the circuit for signal 1S, thereby causing signal 1S to indicate stop.

From an inspection of the drawing, it is obvious that if insulated joint 5 in rail 3b of track 3T should break down and become conducting, relay 3R will be shunted and will therefore be deenergized. If insulated joint 6 in rail 3a of track 3T breaks down, a shunt path will be closed from the positive terminal of battery 8 for section a—b, through jumper 7, rail 3a of track 3T, through joint 6, back to battery 8. This will also cause relay 3R to be deenergized. Relay 4R will likewise become deenergized if joint 5 at the opposite end of the crossover breaks down, or if joint 6 in rail 3b of track 3T should break down. If joints 4 adjacent switches 1W and 2W break down, relays 1R and 2R, respectively, will be shunted. It follows that, in apparatus embodying my invention, protection is provided against any of the insulated joints in crossover track 3T becoming defective.

The use of jumper 7, in addition to protecting against the breaking down of insulated joints 6, prevents batteries 8 of track 3T from operating in series through track ballast leakage.

In the form of apparatus shown in Fig. 2, relays 3R and 4R do not shunt the sections of main tracks 1T and 2T, but the circuit for signal 1S includes contacts 14 and 15 of relays 3R and 4R, respectively, in addition to contacts 12 and 13 of relay 1R, shown in Fig. 1. Likewise, the circuit for signal 2S includes contacts 16 and 17 of relays 4R and 3R, respectively, in addition to contacts 12 and 13 of relay 2R.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In traffic protection apparatus for a stretch of railway in which two main tracks are interconnected by a crossover track, the combination comprising, a pair of insulated joints in each end of said crossover track one joint of each of said pairs located between the rails of the adjacent main track and the other joint of each of said pairs located in the other side of said crossover track adjacent the heel of the corresponding switch, a third pair of insulated joints in the rails of said crossover track between said main tracks, a source of unidirectional current connected across the rails of said crossover track on one side of said third pair of insulated joints with its positive terminal connected to a given rail of said crossover track, a second source of unidirectional current connected across the rails of said crossover track on the opposite side of said third pair of insulated joints with its positive terminal connected to the opposite rail of said crossover track, a jumper connected across said positive terminals of said first and second sources of unidirectional current, a track relay connected across the opposite end of each of the sections of said crossover track between said third pair of insulated joints and said first and second pairs respectively of insulated joints, a section of each of said main tracks each including the switch at its end of said crossover track, and a track circuit for each of said main track sections each including a source of unidirectional current and a polarized relay arranged to be energized in a given direction by current from the source in its track circuit and to be energized in the opposite direction by stray current which might come from the adjacent track circuit of said crossover track.

2. In traffic protection apparatus for a stretch or railway in which two main tracks are interconnected by a crossover track, in which a section of each of said main tracks is set off including the track switch at its end of said crossover track, and in which said crossover track is divided into two sections, the combination comprising, a track circuit for each of said crossover track sections, and a track circuit for each of said main track sections each including a source of current and a polarized relay arranged to be energized in a given direction by current from the source in its track circuit and to be energized in the opposite direction by stray current which might come from the adjacent track circuit for said crossover track.

3. In traffic protection apparatus for a stretch of railway in which two main tracks are interconnected by a crossover track, and in which said crossover track is divided into two sections, the combination comprising, a track circuit for each of said crossover track sections each including a source of current connected across the rails of its section adjacent a mid-point in said crossover track with the terminals of said sources of opposite polarities connected to said sections on opposite sides of said mid-point and each of said track circuits also including a track relay connected across the opposite end of its section, a jumper connected from a given terminal of one of said sources to the terminal of like polarity of the other source, and traffic governing means for said main tracks controlled by means including contacts of said track relays.

4. In traffic protection apparatus for a stretch of railway in which two main tracks are interconnected by a crossover track, in which a section of each of said main tracks is set off including the track switch at the end of said crossover track, and in which said crossover track is divided into two sections each including the frog at its end of said crossover track, the combination comprising, a track circuit for each of said crossover track sections each including a source of current having its terminal of the same given polarity connected with the frog side of its section and each also including a track relay, and a track circuit for each of said main track sections each including a source of current having its terminal of the opposite polarity connected with the frog side of its section and each also including a polarized track relay energized in a given direction by current from the source in its track circuit and energizable in the opposite direction by stray current which might come from the adjacent track circuit of said crossover track.

5. In traffic protection apparatus for a stretch of railway in which two main tracks are interconnected by a crossover track, in which a section of each of said main tracks is set off including the track switch at its end of said crossover track, and in which said crossover track is divided into two sections each including the frog at its end of said crossover track, the combination comprising, a track circuit for each of said crossover track sections each including a source of current having its terminal of the same given polarity connected with the frog side of its section and each also including a track relay, a jumper connected from the opposite side of one of said crossover track sections to the opposite side of the other crossover track section, and a track circuit for each of said main track sections each including a source of current having its terminal of the opposite polarity connected with the frog side of its section and each also including a polarized track relay energized in a given direction by current from the source in its track circuit and energizable in the opposite direction by stray current which might come from the adjacent track circuit of said crossover track.

6. In traffic protection apparatus for a stretch of auxiliary track connected with a main track by a switch, the combination comprising, a section of said auxiliary track including the frog associated with said switch, a section of said main track also including said frog, a track circuit for said auxiliary track section including a source of current having its terminal of a given polarity connected with the frog side of its section and also including a track relay, and a track circuit for said main track section including a second source of current having its terminal of the opposite polarity connected with the frog side of its section and also including a polarized track relay energized in a given direction by current from said second source and energizable in the opposite direction by stray current which might come from said track circuit for said auxiliary track section.

7. In traffic protection apparatus for a stretch of auxiliary track connected with a main track by a switch, the combination comprising, a section of said auxiliary track including the frog associated with said switch, a section of said main track also including said frog, a track circuit for said auxiliary track section including a source of current and a track relay each connected across the rails of said auxiliary track section, and a track circuit for said main track section including a source of current and a polarized relay arranged to be energized in a given direction by current from the source in its section and to be energized in the opposite direction by stray current which might come from said auxiliary track circuit.

8. In a track circuit for a section of railway track, including a source of current of a given polarity connected across the rails of said section, the combination comprising, a polarized relay having a normal polar contact which becomes closed in response to energization of the control winding of said relay by current of said given polarity but which would become opened in response to energization of said relay by stray current of the opposite polarity, said relay also having a back contact which becomes closed when said relay becomes deenergized, a pick-up circuit path including said back contact and the winding of said relay connected across the rails of said section, and said retaining circuit path including a polar contact and the winding of said relay connected across the rails of said section.

9. In an electrical control circuit including a pair of conductors and a source of current of a given polarity connected across said conductors, the combination comprising, a polarized control relay having a normal polar contact which becomes closed in response to energization of the control winding of said relay by current of said given polarity but which would become opened in response to energization of said relay by stray current of the opposite polarity, said relay also having a back contact which becomes closed when said relay becomes deenergized, a pick-up circuit path for said relay including said back contact of said relay connected in series with the winding of said relay across said conductors, and a retaining circuit path for said relay including said polar contact of said relay connected in series with the winding of said relay across said conductors.

10. In traffic protection apparatus for a stretch of railway in which two main tracks are interconnected by a crossover track, in which a section of each of said main tracks is set off including the track switch at its end of said crossover track, and in which said crossover track is divided into two sections each including the frog at its end of said crossover track, the combination comprising, a track relay and a source of current for each of said crossover track sections connected to the rails of the section to form a track circuit, a polarized track relay and a source of current for each of said main track sections connected to the rails of the section to form a track circuit, said sources of current being connected to said sections in such manner that the rails of the main and crossover track sections which include the same frog are connected to terminals of opposite polarities of said sources and that the adjoining ends of the rails of said crossover track sections are also connected to terminals of opposite polarities of said sources, each of said polarized track relays being normally energized in a given direction by current from its track circuit but being energizable in the opposite direction by stray current which might come from the adjacent crossover track circuit.

11. In traffic protection apparatus for a stretch of railway in which two main tracks are interconnected by a crossover track, in which a section of each of said main tracks is set off including the track switch at its end of said crossover track, and in which said crossover track is divided into two sections each including the frog at its end of said crossover track, the combination comprising, a track relay and a source of current for each of said crossover track sections connected to the rails of the section to form a track circuit, a polarized track relay and a source of current for each of said main track sections connected to the rails of the section to form a track circuit, said sources of current being connected to said sections in such manner that adjacent sections have opposite polarities, each of said polarized track relays being normally energized in a given direction by current from its track circuit but being energizable in the opposite direction by stray current which might come from the adjacent crossover track circuit.

12. In traffic protection apparatus for a stretch of railway in which two main tracks are interconnected by a crossover track, in which a section of each of said main tracks is set off including the track switch at its end of said crossover track, and in which said crossover track is divided into two sections each including the frog at its end of said crossover track, the combination comprising, a track relay and a source of current for each of said crossover track sections connected to the rails of the section to form a track circuit, a polarized track relay and a source of current for each of said main track sections connected to the rails of the section to form a track circuit, said sources of current being connected to said sections in such manner that the rails of the main and crossover track sections which include the same frog are connected to terminals of opposite polarities of said sources, each of said polarized track relays being normally energized in a given direction by current from its track circuit but being energizable in the opposite direction by stray current which might come from the adjacent crossover track circuit.

DAVID C. BETTISON.

REFERENCES CITED

The following references are of record in the file of this patent:

UNITED STATES PATENTS

| Number | Name | Date |
|---|---|---|
| 1,063,591 | Potter | June 3, 1913 |
| 1,651,491 | Wallace | Dec. 6, 1927 |
| 2,311,034 | Dodd | Feb. 16, 1943 |
| 2,324,200 | Dodd | July 13, 1943 |
| 2,391,685 | Langdon | Jan. 1, 1946 |
| 2,427,719 | Exner | Sept. 23, 1947 |
| 2,446,216 | Dodd | Aug. 3, 1948 |
| 2,449,224 | Hegeman | Sept. 14, 1948 |

Certificate of Correction

Patent No. 2,565,117  August 21, 1951

DAVID C. BETTISON

It is hereby certified that error appears in the printed specification of the above numbered patent requiring correction as follows:

Column 7, line 25, for "said" read *a*; line 26, for "a polar" read *said polar*;

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*